United States Patent [19]
Furman

[11] Patent Number: 5,832,057
[45] Date of Patent: Nov. 3, 1998

[54] LOCKOUT DEVICE FOR PREVENTING TELEPHONE EAVESDROPPING FROM AN EXTENSION DEVICE, AND METHOD

[76] Inventor: Elliot M. Furman, 10 Kelvin Ct., Nanuet, N.Y. 10954

[21] Appl. No.: 652,825

[22] Filed: May 23, 1996

[51] Int. Cl.$^6$ .............................. H04M 1/24; H04M 3/08; H04M 3/22
[52] U.S. Cl. .................... 379/7; 379/35; 379/167; 379/168; 379/185; 380/6; 380/8
[58] Field of Search ...................... 379/167–168, 379/177, 184–185, 194, 7, 35, 8; 380/9, 19–20, 21, 38, 41, 53, 6, 8

[56] References Cited

U.S. PATENT DOCUMENTS

| | | | |
|---|---|---|---|
| 4,920,565 | 4/1990 | Strawczynski et al. | 380/6 |
| 4,972,469 | 11/1990 | Saltwick et al. | 380/6 |
| 5,210,794 | 5/1993 | Brunsgard | 380/6 |
| 5,307,370 | 4/1994 | Eness | 380/6 |
| 5,553,126 | 9/1996 | Tang | 379/185 |
| 5,617,476 | 4/1997 | Ibaraki et al. | 380/6 |

*Primary Examiner*—Curtis A. Kuntz
*Assistant Examiner*—Duc Nguyen
*Attorney, Agent, or Firm*—Paul Hentzel

[57] ABSTRACT

Remote telephone coder 10R and local telephone coder 10L provide coding and decoding for voice communication between remote telephone set 11R and local telephone set 11L through telephone line 12. An eavesdropper listening in on a listening device such as remote extension telephone 14R or local extension telephone 14L hears normal "in-the-clear" conversation (uncoded transmissions) when both of the telephone coders are in the normal mode. However, when both of telephone coders 10R and 10L are in the code mode, the extension eavesdropper using an extension telephone or other unauthorized listening device 14 (shown in phantom) hears only coded transmissions. Further, a remote eavesdropper on remote extension telephone set (main portion 17M with hand portion 17H) employing remote extension coder 16R is also excluded from the coded transmissions between remote telephone coder 10R and local telephone coder 10L.

33 Claims, 8 Drawing Sheets

System
Interface Device 30

Telephone Interface Device 50

Lock-out Unit 60

Demodulator 70

LOCKOUT DEVICE FOR PREVENTING TELEPHONE EAVESDROPPING FROM AN EXTENSION DEVICE, AND METHOD

TECHNICAL FIELD

This invention relates to telephone eavesdropping security, and more particularly to locking out extension devices such as extension telephones.

BACKGROUND

Heretofore eavesdropping prevention was accomplished by employing a single telephone set on a single line which was dedicated to sensitive information. Extension telephones were not permitted on this dedicated line. Other non-dedicated lines were provided for general use. However, most households have a single line with an extension telephone in every room. Each extension represents a potential eavesdropper, a threat to security. One solution to the multiple extension problem was to physically disconnect (or electronically switch off) each of the unsecured extension telephones prior to making a sensitive telephone call. Policing the extensions did not resolve covert extensions or unauthorized listening devices such as wire taps and tiny wireless "bugs". These unauthorized listening devices may be easily installed in the telephone set under surveillance or anywhere along the telephone line within a house or even external to a house. Larger pick-up devices and recording units are routinely hard wired into monitored telephone lines.

SUMMARY

It is therefore an object of this invention to provide an apparatus and method to prevent telecommunication eavesdropping which does not require the user to discover and disconnect extension telephones and other unauthorized listening devices.

It is another object of this invention to provide such an apparatus which is low cost, simple to install and easy to use.

It is a further object of this invention to provide such an apparatus which is compatible with conventional telephone sets.

It is a further object of this invention to provide such an apparatus which is portable and may be installed as needed.

It is a further object of this invention to provide such an apparatus which permits the convenience of multiple extension telephones.

Briefly, these and other objects of the present invention are accomplished by providing a local communication coder for linking between a local telephone and a telecommunication system. The local telephone coder is responsive to an in-coming wait signal from a cooperating remote communication coder linked to the telecommunication system. The wait signal enables the local coder and the remote coder to encode and decode communications. The telephone coders lockout any cooperating extension communication coders linked to the telecommunication system from encoding and decoding communications. A wait circuit advances the local coder from a normal mode of operation to a wait mode of operation. During the normal mode out-going communications from the local coder are not encoded and in-coming communications to the local coder are not decoded. During the wait mode the local coder listens for the wait signal from the remote coder. A listen delay circuit is responsive to the wait circuit for opening a listen window in the local coder to the remote coder as the local coder advances from the normal mode to the wait mode. A listen circuit detects the in-coming wait signal from the remote coder during the wait mode to determine if the remote coder has advanced to the wait mode. A send circuit is responsive to the listen circuit for opening a send window, and for sending an out-going wait signal to the remote coder indicating that the local coder has advanced to the wait mode. A lockout unit is responsive to the listen circuit and to the send circuit for advancing the local coder from the wait mode of operation to a code mode of operation. During the code mode, the local coder and the remote coder are enabled to encode out-going communications and to decode in-coming communications. Extension coders are locked out from the encoding and decoding. A code unit is responsive to the lockout unit for the encoding out-going communications and decoding in-coming communications during the code mode.

BRIEF DESCRIPTION OF THE DRAWING

Further objects and advantages of the present telephone coder and the operation of lockout unit will become apparent from the following detailed description and drawing in which.

GENERAL SYSTEM (FIG. 1)

Figure 1:
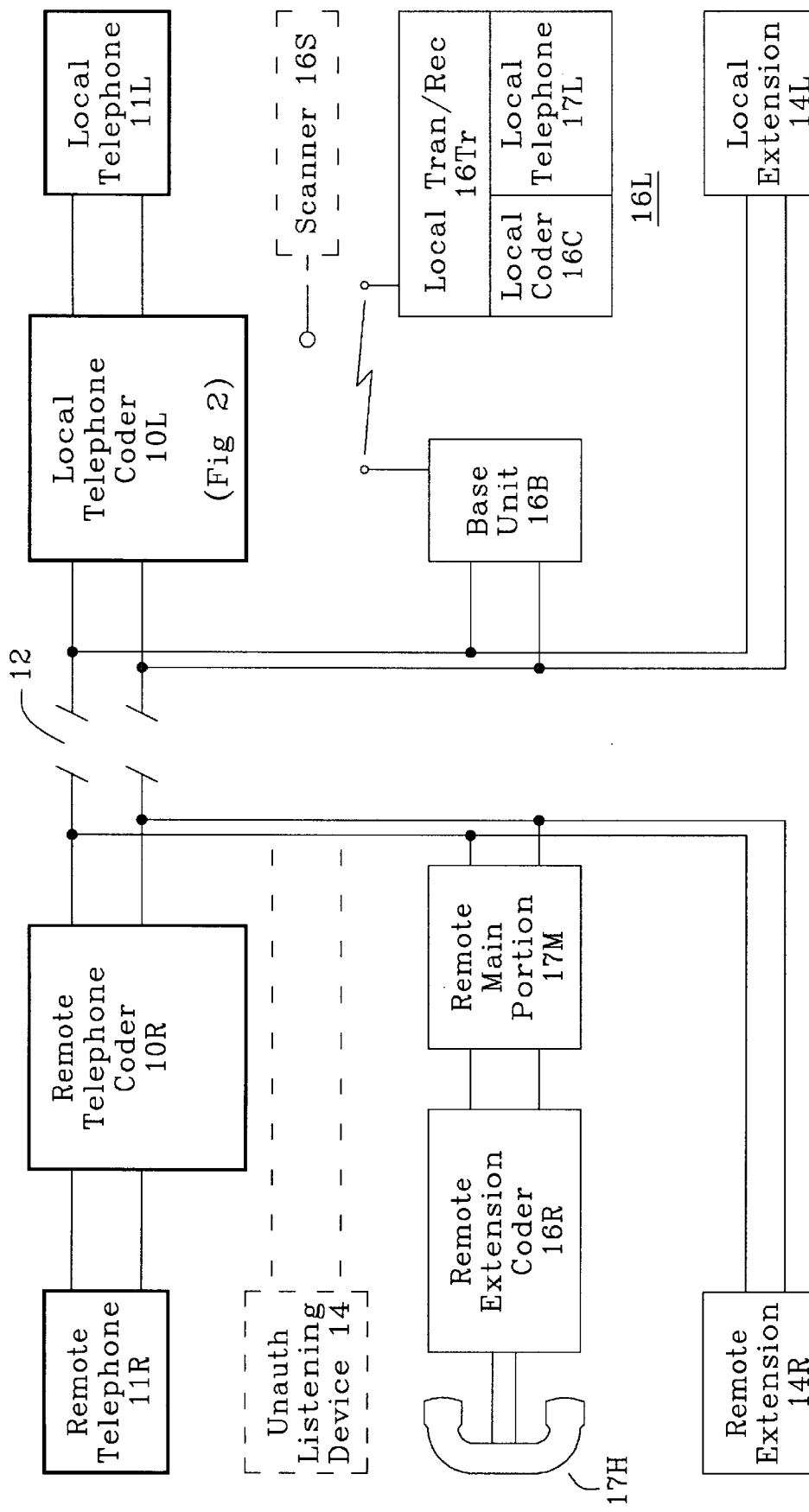
FIG. 1 is a block diagram of a telecommunication system showing several embodiments of telephone coders connected to telephones.

Remote telephone coder 10R and local telephone coder 10L provide coding and decoding for voice communication between remote telephone set 11R and local telephone set 11L through telephone line 12. An eavesdropper listening in on a listening device such as remote extension telephone 14R or local extension telephone 14L hears normal "in-the-clear" conversation (uncoded transmissions) when both of the telephone coders are in the normal mode. However, when both of telephone coders 10R and 10L are in the code mode, the extension eavesdropper using an extension telephone or other unauthorized listening device 14 (shown in phantom) hears only coded transmissions. Further, a remote eavesdropper on remote extension telephone (main portion 17M with hand portion 17H) employing remote extension coder 16R is also excluded from the coded transmissions between remote telephone coder 10R and local telephone coder 10L. Only two telephone coders which have been linked together through a lockout protocol may participate in mutual coding and decoding in the code mode.

Local telephone coder 16L is a cordless embodiment in which local telephone coder 16C and local telephone handset 17L are located on the portable cordless portion of the telephone. The transmissions between cordless transmit/ receive unit 16TR and base unit 16B are coded and decoded by local coder 16C. This cordless embodiment is disclosed in more detail in a later section under the heading "CORDLESS EMBODIMENT".

The telephone coders have three modes of operation, a normal mode, a wait mode, and a code mode.

Normal Mode

During the normal mode of operation (shown in FIG. 2) remote telephone set 11R and the local telephone set 11L function in their normal manner unaffected by the telephone coders. During the normal mode of operation the telephone coders are preferably not connected to either the telephone set or the telephone line. The remote telephone set is connected directly to the local telephone set through the telephone line and both sets are powered by telephone line current. The telephone coders are completely bypassed and voice communication is uncoded. At power on, VCC is applied to PWR LED (see FIG. 2) through current limiting resistor R49 (360 ohms). PWR LED is activated during all three modes of operation.

Wait Mode

During the wait mode of operation the telephone coders are activated establishing an exclusive wait communication loop between remote telephone set 11R and local telephone set 11L. Remote extension (main portion 17M with hand portion 17H) and local extension 17L become locked out from this wait communication loop. The telephone coders 16R and 16C for these extension telephones do not advance to the wait mode. Remote extension 14R and local extension 14L do not have telephone coders and therefore are also locked out of the wait communication loop. No voice communication is possible during the wait mode either uncoded or coded. The wait mode is initiated by energizing isolation relays RLY1 and RLY2 from the normal isolation position (shown in FIG. 2) to the connected position. A wait indicator WAIT LED is activated during the wait mode. The remote telephone coder becomes connected between the remote telephone set and the telephone line and the local telephone coder becomes connected between the local telephone set and the telephone line.

Code Mode

During the code mode of operation the telephone coders are fully engaged and the remote telephone set and the local telephone set are in coded voice communication. A code indicator CODE LED is activated during the code mode.

GENERAL TELEPHONE CODER 10L (FIG. 2)

Local communication coder 10L links local telephone set 11L with telecommunication system 12. The local coder is responsive to an in-coming wait signal WAIT SIG IN from a cooperating remote communication coder also linked to the telecommunication system. When in the code mode of operation, the local coder and remote coder are enabled to encode and decode communications. Other extension communication coders linked to the telecommunication system are locked out from encoding and decoding communications. A wait circuit advances the local coder from the normal mode of operation to a wait mode of operation. During the normal mode of operation out-going communications from the local coder are not encoded and in-coming communications to the local coder are not decoded. In the wait mode of operation the local coder listens for WAIT SIG IN from the remote coder.

Figure 3:
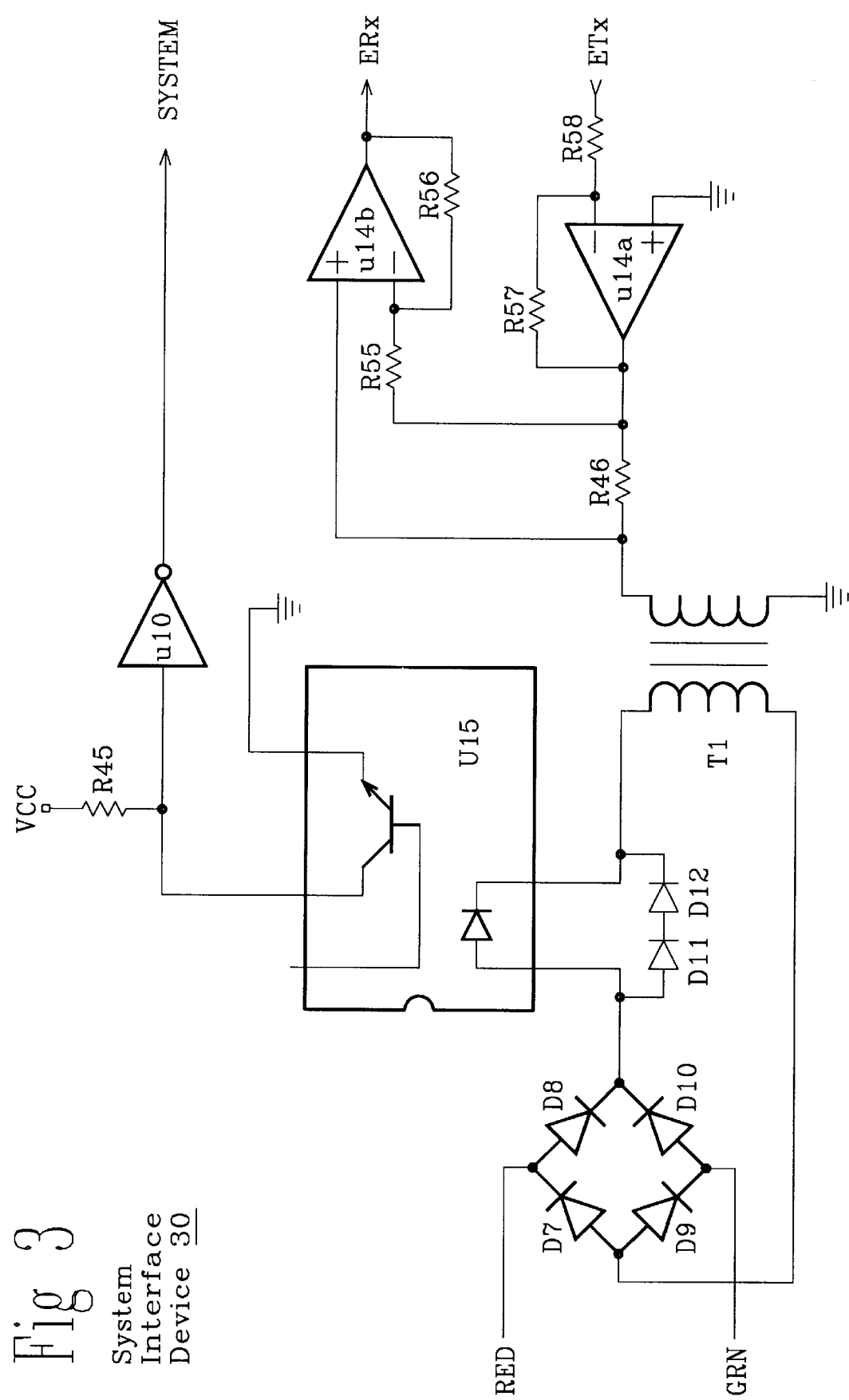
FIG. 3 is a schematic diagram of system interface device 30 of FIG. 2 showing the circuit components thereof.

Telephone system interface device 30 (shown in detail in FIG. 3) interfaces between conductors RED (ring) and GRN (tip) of the telephone line and the code unit 40 of the local telephone coder. The system interface device links the local coder to telecommunication system 12, providing suitable impedance matching and component isolation therebetween. The system interface device senses the presence of system current from the telecommunication system to provide SYSTEM control voltage high indicating that the local telephone coder is connected to the telephone system. In addition the system interface device provides separation between the encoded transmitted communications ETx from the local telephone set and the received encoded communications ERx from the remote telephone set which are transmitted simultaneously along the telephone line.

A code unit 40 (shown in detail in FIG. 4) is responsive to lockout unit 60 for the encoding out-going communications Tx from telephone interface device 50 to provide encoded communications ETx to system interface device 30 during the code mode. The code unit also decodes in-coming encoded communications ERx from system interface device 30 to provide decoded communications Rx to telephone interface device 50 during the code mode.

Figure 5:
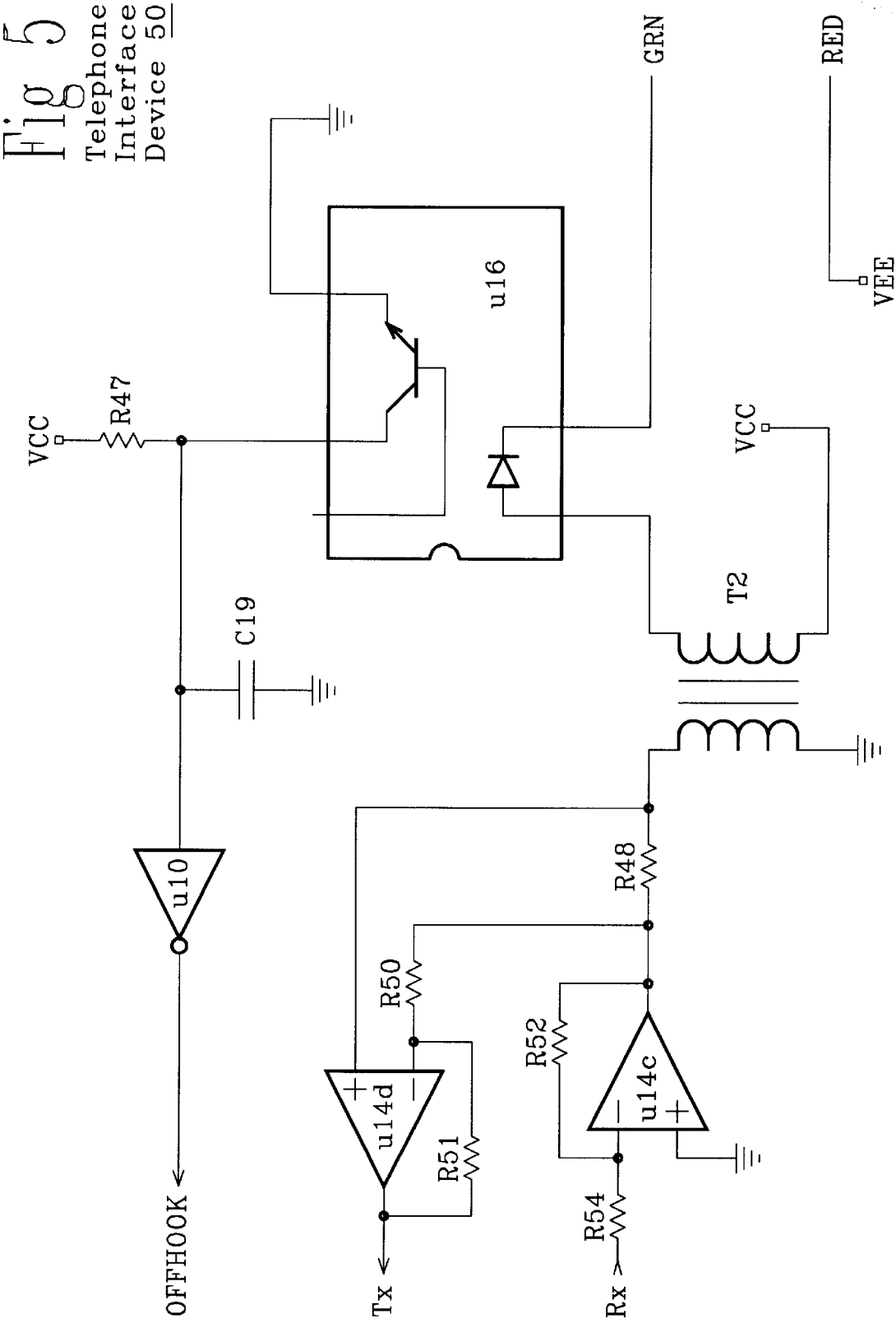
FIG. 5 is a schematic diagram of telephone interface device 50 of FIG. 2 showing the circuit components thereof.

Telephone interface device 50 (shown in detail in FIG. 5) interfaces between conductors RED (ring) and GRN (tip) of the local telephone set and local telephone coder 10L. The telephone interface device provides suitable impedance matching and separation between the uncoded transmitted communications Tx and the decoded received communications Rx. Telephone interface device provides connection to local telephone 11L and senses whether the local telephone is cradled on hook or lifted off hook. OFFHOOK control voltage high from the telephone interface device indicates that the handset of the local telephone set has been lifted by the local user. Operating current is supplied to the telephone set by the telephone interface device through conductors RED and GRN of the telephone set as the lift switch closes.

Figure 6:
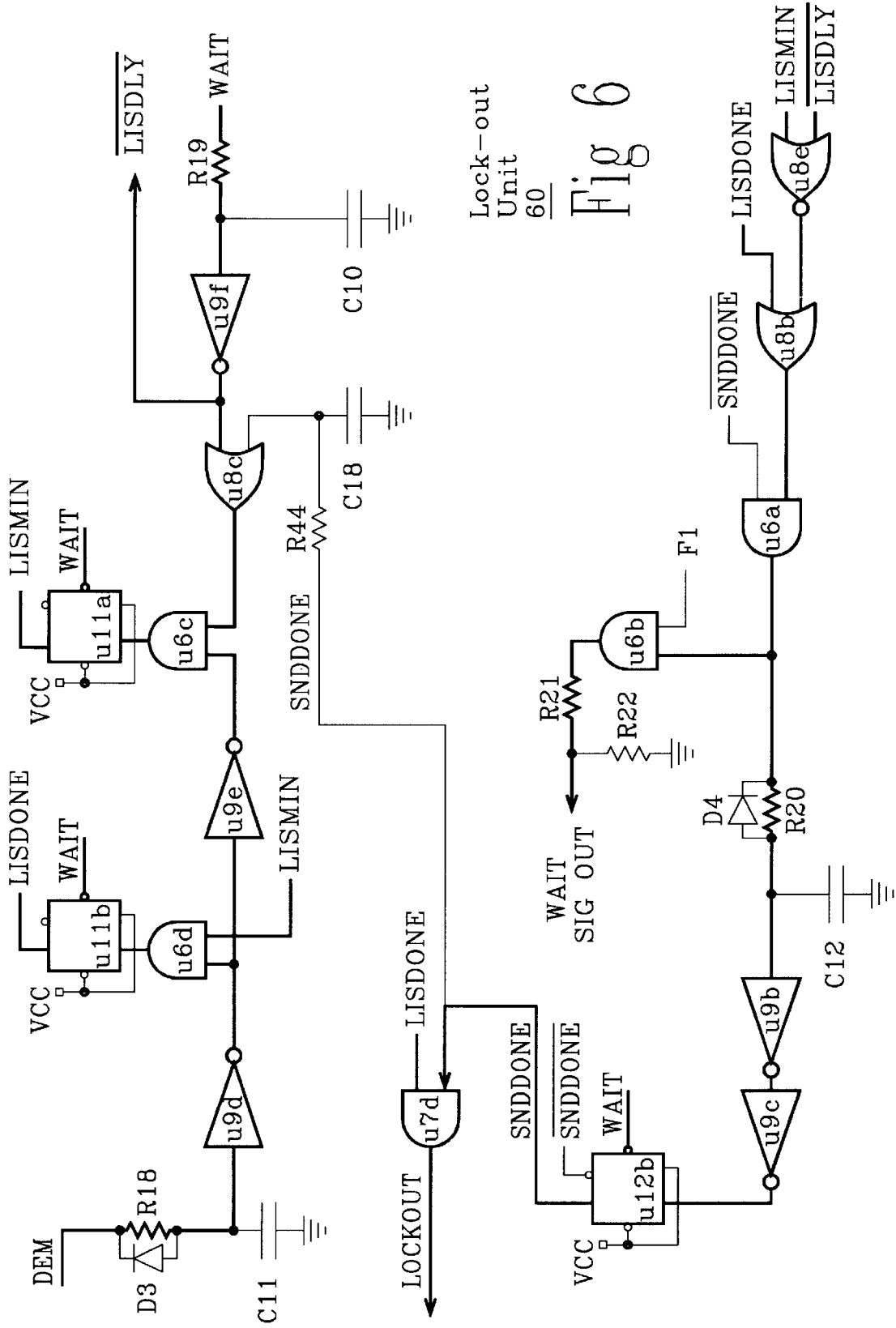
FIG. 6 is a schematic diagram of lockout unit 60 of FIG. 2 showing the circuit components thereof.
Figure 7:
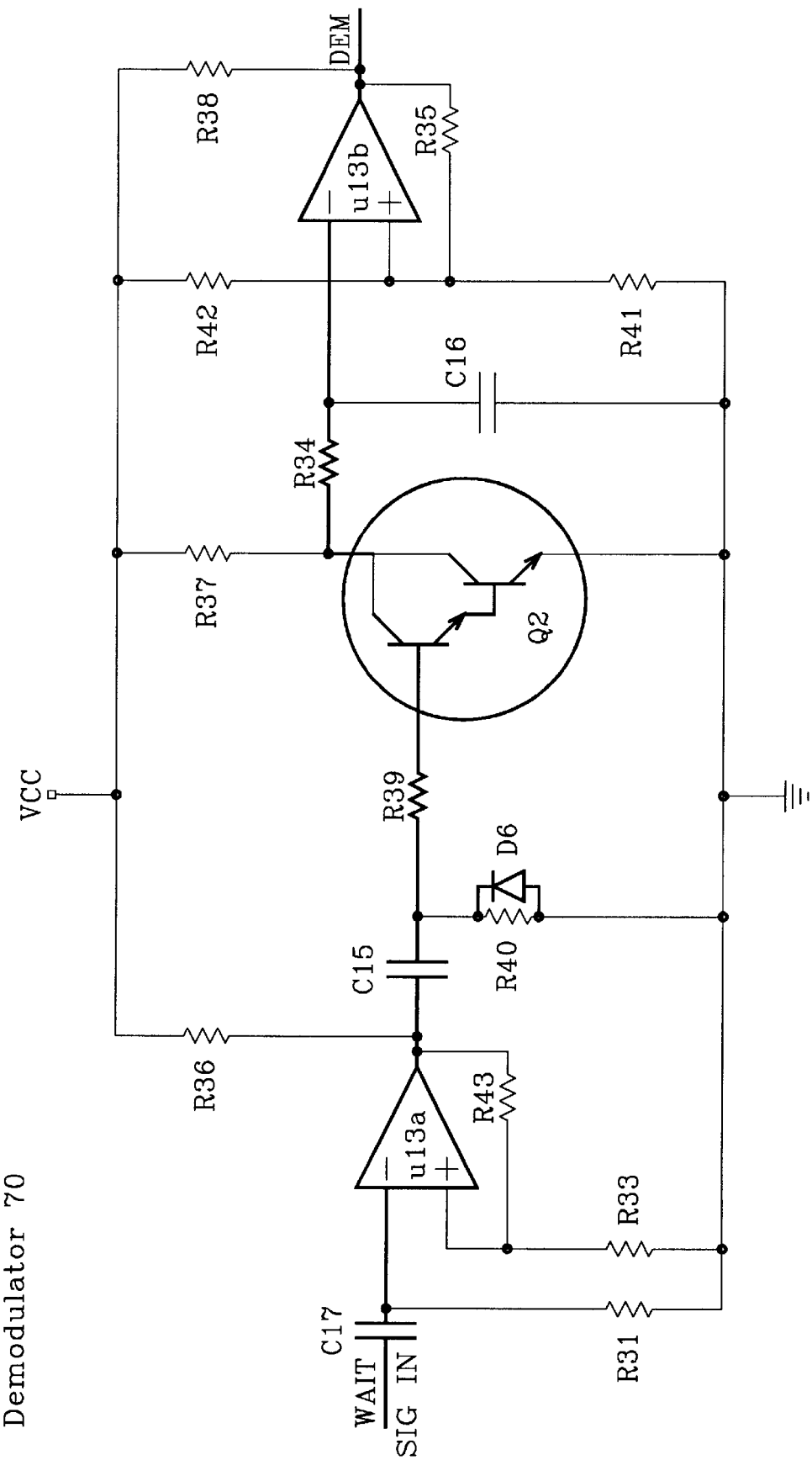
FIG. 7 is a schematic diagram of demodulator 70 of FIG. 2 showing the circuit components thereof.

Lockout unit 60 (shown in detail in FIG. 6) establishes the exclusive communication code loop between the remote telephone set and the local telephone set. Eavesdropping is prevented because remote extension 14R and local extension 14L are locked out of the communication code loop. LOCKOUT control voltage high to code unit 40 reroutes the Tx communications and the ERx communications after the mode of operation has advanced from the wait mode to the code mode. Lockout unit 60 provides LISDLY BAR (listen delay) control voltage, WAIT SIG OUT signal, and various time delays required to advance the remote telephone coder and the local telephone coder into the code mode.

Demodulator stage 70 is responsive to the in-coming wait signal WAIT SIG IN from the remote coder, and assists lockout unit 60 in determining when the listen circuit has been listening to WAIT SIG IN for a minimum period of time.

Remote telephone coder 10R is shown as a single block for illustration only. The remote telephone coder has a circuit corresponding to each circuit of local telephone coder 10L. That is, the remote telephone coder also has a wait circuit, a system interface device, a code unit, a telephone interface device, a lockout unit, and a demodulator.

WAIT CIRCUIT (FIG. 2)

The wait circuit (shown in FIG. 2) permits the local user to advance the local coder from the normal mode to the wait mode. User wait switch SW switches the telephone coder from a standby state to an active state, and initiates the wait mode. The wait switch may be any suitable switching device such as a momentary contact pushbutton switch. The user closes wait switch SW setting wait latch u12a (an edge triggered 74HC74 flip-flop) into the wait state (Q output high). The wait latch prevents the local coder from returning to the normal mode after the momentary wait switch has been released by the local user.

The wait latch is responsive to the system interface device for permitting the local coder to advance from the normal mode to the wait mode when system current is present, and for returning the local coder to the normal mode when system current is not present. The wait latch is also responsive to the telephone interface device for permitting the local coder to advance from the normal mode to the wait mode when the local telephone is off hook, and for returning the local coder to the normal mode when the local telephone is on hook. The wait latch is powered by the local coder operating power for permitting the local coder to advance from the normal mode to the wait mode when the operating power is present, and for returning the local coder to the normal mode when operating power is not present.

Alternatively, the local coder may be unpowered or low powered while in the standby state during the normal mode of operation. The local coder is then raised to the full power active state when the wait circuit advances the local coder from the normal mode to the wait mode.

The control voltage WAIT from the wait latch to lockout unit 60 goes high for advancing the telephone coder from the normal mode to the wait mode. The CLK input is low due to inverter u9a (⅙ 74HC14) through positive voltage supply VCC (+6 volts DC) when the wait switch is open. As the wait switch SW closes, the node between resistors R23 (4.7 k ohms) and R24 (100 k ohms) drops to ground causing capacitor C14 (0.1 microfarad) to discharge. CLK is thereby held low during the switching transients until C14 discharges. The preset (PR) input to the wait latch is "tied" high to VCC, and the D input is hardwired to the QBAR (Q') input for assisting in flipping between the clear state and the wait state.

Figure 2:
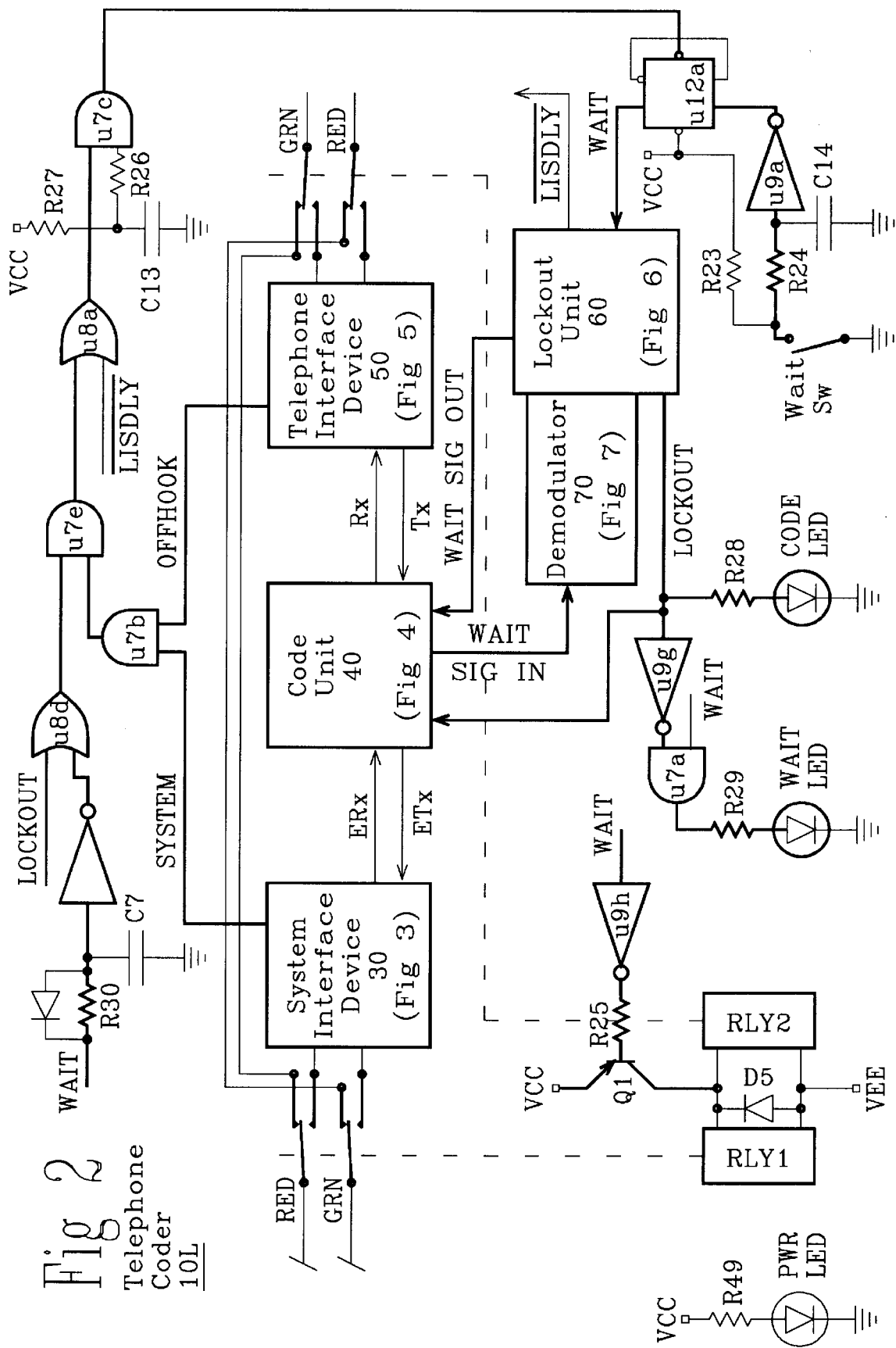
FIG. 2 is a block schematic diagram of local telephone coder 10L of FIG. 1 showing the wait circuit and isolation device in detail.

WAIT high (in conjunction with LOCKOUT low) activates a wait mode indicator for indicating to the local user when the local coder has advanced to the wait mode of operation. The wait mode indicator may be any suitable indicator such as a user visible light on the local coder. The light is on when the local coder is in the wait mode. In the embodiment of FIG. 2, LOCKOUT low through inverter u9g (⅙ 74HC14) and WAIT high activate WAIT LED through AND gate u7a (¼ 74HC08) and current limiting resistor R29 (360 ohms). Alternatively, the wait mode indicator may be a user audible tone such as 450 Hz (TONE see FIG. 4) which is played into the local telephone when the local coder is in the wait mode.

WAIT high also energizes an isolation device such as system isolation relay RLY1 and telephone isolation relay RLY2 from the normal isolation position into the telephone coder connected position. The isolation relays are responsive to WAIT high from wait latch for isolating the telecommunication system from the local coder while the local coder is in the normal mode. The isolation relays also couple the telecommunication system to the local coder while the local coder is in the wait mode or the code mode. The relays have an isolation position (shown in FIG. 2) in which the local coder is disconnected from the telecommunication system and from the local telephone, and the local telephone is connected directly to the telecommunication system. The relays also have a connected position in which the local coder is connected to the telecommunication system and the local telephone is connected to the local coder.

The isolation device may be any suitable switching relay such as double pole double throw relay DS2E-M-DC12. The relays are energized by VCC/VEE current switched through Q1 (2N3906) in response to WAIT applied through relay inverter u9h (⅙ 74HC14) and current limiting resistor R25 (4.7 k ohms).

The isolation device may be back emf protected by any suitable device such as diode D5 (1N4002). The relays are in the isolation position when the local coder is unpowered (or low powered).

System isolation relay RLY1 connects conductors RED and GRN of telephone line 12 to system interface device 30. Telephone isolation relay RLY2 connects conductors RED and GRN of local telephone set 11L to telephone interface device 50. These relays are normally de-energized holding the telephone coder in the normal mode. During the normal mode the telephone coder is bypassed by the telephone system, and the telephone coder is isolated from the telephone system at both the system interface device end and the telephone interface device end.

When the clear input to wait latch u12a becomes high, latch u12a may go high when the CLK input transitions from low to high (Wait SW closed). When the clear input is low WAIT is forced low, and cannot change state even if the wait switch is pressed.

When the handset is cradled (OFFHOOK low) or the telephone system disconnected (SYSTEM low) the wait latch resets and WAIT goes low, returning the telephone coder to the normal mode. Lockout unit 60 receives WAIT high and provides LISDLY BAR (listen delay) high for a one second listen delay period at the clear input to the wait latch through OR gate u8a and AND gate u7c (¼ 74HC08). The early presence of LISDLY BAR high forces the u12a clear input high to ensure that the wait latch toggles on properly when the wait switch is closed. After the listen delay period ends (LISDLY BAR low) both SYSTEM and OFFHOOK must be high for the clear input to remain high and for WAIT to stay high.

AND gate u7c along with resistor R27 (100 k ohms), resistor R26 (4.7 k ohms) and capacitor C13 (2.2 microfarads) form a power on reset circuit which ensures that the wait latch is in the clear state as the telephone coder is connected to the external power source. AND gate u7c initially presents a low voltage to the clear input forcing the wait latch into the clear state (WAIT low). Immediately after power on, the resistor-capacitor node is at ground. The output of AND gate u7c and the clear input to the wait latch are therefore both low forcing WAIT low. Capacitor C13 charges during the power reset period (about 0.2 seconds), the power-on input to u7c becomes high.

A "time-out" reset circuit is formed by AND gate u7e and OR gate u8D along with resistor R30 (1 meg ohms) and capacitor C7 (30 microfarads), which ensures that the coder returns to the normal mode from the wait mode when WAIT SIG IN fails to appear. During the normal mode, WAIT is low and LOCKOUT BAR on the upper input of OR gate u8d is also low. WAIT (low) is inverted and forces a high on the lower input of OR gate u8d. These low and high inputs provide a high output from OR gate u8d to the upper input of AND gate u7e. When WAIT goes high time-out capacitor C7 starts to charge. After a time-out period (about 30 seconds) the capacitor is charged high sufficiently to drive the lower input to OR gate u8d low. The coder returns to the normal mode from the wait mode if WAIT SIG IN has failed to appear during the time-out period.

SYSTEM INTERFACE DEVICE 30 (FIG. 3)

System coupling transformer T1 provides AC coupling between the Rx and Tx communications at the RED and GRN conductors of telephone system 12 and receiving and transmitting channels to code unit 40. Optoisolator u15 (4N26) contains an LED for generating light in response to telephone line current, and a photo-transistor which turns on in response to the LED light. The photo-transistor turns on and SYSTEM goes high when system relay RLY1 is in the telephone coder connected position and system current flows through system coupling transformer T1. Bridge rectifiers D7, D8, D9, and D10 (four 1N4002) maintain line current through the LED in the conducting direction even if the telephone line polarity has been reversed by the telephone company or the RED and GRN conductors have been reversed due to wiring errors. Current shunting diodes D11 and D12 (two 1N4002) protect optoisolator u15 against excessive line current.

Transmitting channel amplifier u14*a* (¼ LM348) operates as an inverting amplifier for the ETx communications from the telephone coder. Amplifier u14*a* has input resistor R58 (50 k ohms) and feedback resistor R57 (100 k ohms) which provides a gain of about minus two (−2). Receiving channel amplifier u14*b* (¼ LM348) operates as a difference amplifier for separating the Tx communications in the transmitting channel from the Rx communications in the Rx channel.

Difference amplifier u4*b* has input resistor R55 (100 k ohms) and feedback resistor R56 (100 k ohms) which provides an overall gain of about plus one (+1). The non-inverting side has a gain of about plus two (+2) and the inverting side has a gain of about minus one (−1). Resistor R46 (1 k ohms) and T1 (about 1 k impedance in the operating range of 300–3,400 Hz) provide about a 2:1 voltage division.

Signals coming from u14*a* produce signals across R46 and T1, and thus onto the telephone line. But because of the voltage divider formed by R46 and T1 and the gain of differential amplifier u14*b* (+2 on non-inverting side, −1 on inverting side) these signals do not appear in the receiving channel (ERx). But signals coming from the telephone line produce voltages across T1 and R46 which are amplified by u14*b*. This signal appears in the receiving channel. Signals in the transmission channel from u14*a* produce transmission voltages across R46 and T1 which are isolated from the receiving channel.

CODE UNIT 40 (FIG. 4)

Figure 4:
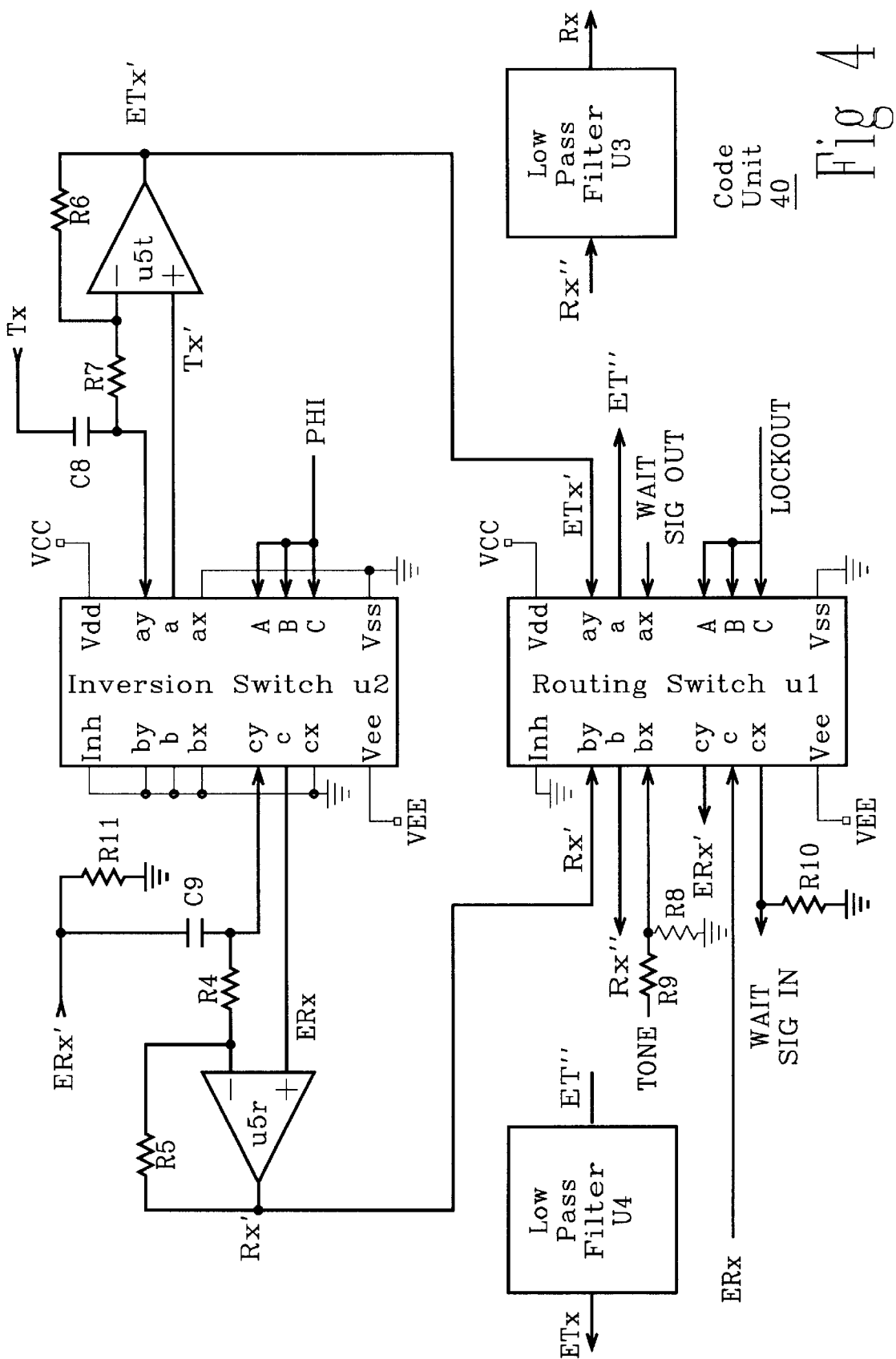
FIG. 4 is a schematic diagram of code unit 40 of FIG. 2 showing the circuit components thereof.

Code unit 40 provides decoding of the encoded ERx communications in the receiving channel which arrive from the remote telephone coder through the telecommunication system 12 and system interface device 30. The code unit also provides encoding of the uncoded Tx communications in the transmitting channel which arrive from the local telephone set through telephone interface device 50. Any suitable encoding/decoding technique may be employed in the code unit such as frequency inversion as shown in the embodiment of FIG. 4.

Tx encoder inversion amplifier u5*t* (½ LF353) is driven by inversion switch u2 (analog multiplexer-demultiplexer CD4053). The inversion frequency PHI is 3600 Hz. PHI switches port "a" (Tx section A of u2) to port "ax" each negative half cycle (PHI low) and switches port "a" to port "ay" each positive half cycle (PHI high). During the negative half cycle, the non-inverting input of Tx amplifier u5*t* is connected to ground providing a gain of about minus one between Tx and ETx'. The inverting input to Tx amplifier u5*t* is hardwired into the transmitting channel through input capacitor C8 (0.1 microfarads), input resistor R7 (100 k ohms) and feedback resistor R6 (100 k ohms). During the positive half cycle, the non-inverting input connects to the R7/C8 node. During the positive half cycle, the non-inverting input of Tx amplifier u5*t* receives Tx (through C8) as the input, and receives ground during the negative half cycle. Tx' is switched between Tx and ground. The output ETx' of Tx amplifier u5*t* is therefore Tx times a gain of about minus one during the negative half cycle and Tx times a gain of about plus one during the positive half cycle.

Rx decoder inversion amplifier u5*r* (½ LF353) is also driven by inversion switch u2 (analog multiplexer-demultiplexer CD4053). The inverting input to Rx amplifier u5*r* is hardwired in the receiving channel at a gain of about minus one through input capacitor C9 (0.1 microfarads), input resistor R4 (100 k ohms) and feedback resistor R5 (100 k ohms). PHI switches the Rx section C of switch u2 (ports "c", "cx", and "cy") to alternate the gain of Rx amplifier u5*r*. Alternating the gain of Tx amplifier u5*t* and Rx amplifier u5*r* causes the inversion of the Tx communication (which becomes Tx') and the ERx communication (which becomes Rx').

The receiving channel (containing Rx') and transmitting channel (containing ETx') are routed to low pass filters u3 and u4 by routing switch u1 (analog multiplexer-demultiplexer CD4053). Low pass filter u4 receives ET" from routing switch u1 and provides ETx to system interface device 30.

Filter u4 removes any residual 3600 Hz inversion frequency which passes through the frequency inversion circuit from the transmitting channel to system interface device 30. In addition Tx filter u4 removes the upper sideband from the Tx communications. The upper sideband is outside the operational bandwidth of conventional telephones. Filter u4 may be any suitable low pass filter such as a fourth order Chebyshev (CHE) filter having a cut-off frequency of about 3300 Hz.

Low pass filter u3 receives Rx" from routing switch u1 and provides Rx to telephone interface device 50. Filter u3 similarly removes the 3600 Hz inversion frequency and upper sideband from Rx communications in the receiving channel to telephone interface device 50. Filters u4 and u3 also remove any other unwanted frequency component and harmonics. Filter u3 may be any suitable low pass filter such as an eighth order elliptic filter having a cut-off frequency of about 3400 Hz.

Routing switch u1 has a wait mode state for the wait mode of operation, and a code mode state for the code mode of operation. The routing switch is responsive to the listen circuit and the send circuit in lockout unit 60.

Section A of the routing switch routes WAIT SIG OUT from the local coder to the remote coder when in the wait mode state, and routes the out-going encoded communications ETx' from the local coder to the remote coder when in the code mode state.

Section B of the routing switch routes TONE (450 Hz) wait mode audio indicator to the local telephone during the wait mode of operations, and routes the in-coming decoded communications Rx' from the remote coder to the local coder when in the code mode state. Voltage dividing resistor network R9 (100 k ohms) and R8 (1 k ohms) reduce the audio level of TONE.

Section C of the routing switch routes WAIT SIG IN from the remote coder to the listen circuit (in lockout unit 60) when in the wait mode state, and routes the in-coming encoded communications ERx from the remote coder to the code unit when in the code mode state. Resistor R10 (4.7 k ohms) provides a resistive load for u14*b* in system interface device 30 during LOCKOUT low. Resistor R11 (4.7 k ohms) provides this resistive load during LOCKOUT high.

TELEPHONE INTERFACE DEVICE 50 (FIG. 5)

Telephone interface device 50 is similar in operation to system interface device 30. Telephone coupling transformer T2 provides AC coupling between the Rx and Tx communications at the RED and GRN conductors of local telephone set 11L and receiving and transmitting channels to code unit 40.

Optoisolator u16 (4N26) contains an LED for generating light in response to operating current flowing through telephone coupling transformer T2 from +VCC to −VEE. A photo-transistor within optoisolator u16 conducts in response to the LED light. As a result, the photo-transistor conducts and OFFHOOK is high when the handset is lifted and operating current is present.

Receiving channel amplifier u14c (¼ LM348) operates as an inverting amplifier for the Rx communication to the local telephone set. Amplifier u14c has input resistor R54 (50 k ohms) and feedback resistor R52 (100 k ohms) providing a gain of about minus two (−2).

Transmitting channel amplifier u14d (¼ LM348) operates as a difference amplifier for separating the Rx communication in the receiving channel from the Tx communication in the transmitting channel which come from local telephone 11L (coupled through T2). Amplifier u14d has input resistor R50 (100 k ohms) and feedback resistor R51 (100 k ohms) which provides a gain of about minus one (−1). Resistor R48 (620 ohms) and T1 (about 620 ohms impedance in the operating range of 300–3,400 Hz) provide about a 2:1 voltage division. Amplifiers u14c and u14d operate similarly to amplifiers u14a and u4b in system interface device 30. Reception in the receiving channel from u14c produce receiving voltages across R48 which are isolated from the transmission channel. The gain ratios of difference amplifier u14d nullifies the R48 voltages, which do not appear at the output of transmitting amplifier u14d.

LOCKOUT UNIT 60 (FIG. 6)

The lockout unit 60 in local telephone coder 10L establishes the exclusive communication code loop between the remote telephone set and the local telephone set. A listen delay circuit within lockout unit 60 is responsive to the wait circuit for opening a listen window in the local coder to the remote coder as the local coder advances from the normal mode of operation to the wait mode of operation.

The listen circuit (formed by demodulator 70, plus gates u6d, u6c, and u8c, plus latches u11b and u11a) detects WAIT SIG IN from the remote coder (through demodulator 70) during the wait mode to determine if the remote coder has advanced to the wait mode of operation.

The send circuit (formed by gates u8e, u8b, u6a, and u6b, plus latch u12b) is responsive to the listen circuit and the listen delay circuit and the send circuit for opening a send window, and for sending an out-going WAIT SIG OUT to the remote coder indicating that the local coder has advanced to the wait mode of operation.

A lockout circuit (formed by gate u7d plus routing switch u1) is responsive to the listen circuit and to the send circuit for advancing the local coder from the wait mode to a code mode, and for locking out any extension coders from encoding and decoding.

A listen minimum stage within the lockout unit 60 provides a listen minimum status (LISMIN high) in response to the listen delay circuit during the listen window and to the demodulator stage after a minimum listen period. The listen minimum stage is also responsive to the send circuit after the send window has closed and to the demodulator stage after the minimum listen period for providing the listen minimum status.

A listen done stage within the lockout unit is responsive to the listen minimum status (LISMIN high) of the listen minimum stage and to the demodulator stage after the minimum listen period. The listen done state detects the termination of the in-coming wait signal from the remote coder to provide a listen done status (LISDONE high).

A listen window is opened by the listen delay circuit for a predetermined period of time. An open window stage (formed by gates u8e and u8b within the send circuit) is responsive to the listen circuit for opening the send window in order to start sending the out-going wait signal to the remote coder.

A send delay circuit (formed by D4, R20 and C12 within the send circuit) is responsive to the open window stage for holding the send window open for the duration of the send window.

A close window stage (formed by latch u12b within the send circuit and u6a) is responsive to the send delay circuit for closing the send window in order to stop sending the out-going wait signal to the remote coder.

The send window is held open by the send delay circuit for a predetermined period of time. The predetermined period of the send window is about two seconds, and the send delay circuit is a resistor-capacitor charging network.

The lockout protocol of lockout unit 60 in local telephone coder 10L proceeds in three steps during the wait mode (a Listen Delay Step, a Send Signal Step, and a Receive Signal Step). The three steps are in effect regardless of who presses the wait switch first, the local user or the remote user.

LOCKOUT PROTOCOL STEPS FOR THE LOCAL TELEPHONE CONTROLLER DURING THE WAIT MODE

1) Listen Delay Step

Local telephone coder listens for an in-coming WAIT SIG IN from remote telephone coder for about a one second listen delay period. The absence of WAIT SIG IN indicates that remote telephone coder is not in the send signal step. The local telephone coder therefore advances to the send signal step. The presence of WAIT SIG IN from the remote telephone coder indicates that the remote telephone coder has already advanced to the send signal step. The local telephone coder therefore advances to the receive signal step.

2) Send Signal Step

Local telephone coder sends WAIT SIG OUT to remote telephone coder for about two seconds.

3) Receive Signal Step

Local telephone coder receives WAIT SIG IN to remote telephone coder for at least 0.4 seconds.

The lockout unit in the remote telephone coder has an identical lockout protocol which compliments the local telephone coder in operation. Either coder may advance to the listen delay step first. The other coder responds in turn to effect the lockout protocol.

The one second listen delay step is started by WAIT high from wait latch u12a. WAIT low clears (resets) all three lockout unit latches, close window latch u12b (½ 74HC74 flip-flop), listen minimum latch u11a (½ 74HC74 flip-flop), and listen done latch u11b (½ 74HC74 flip-flop) into the low state (Q output low).

WAIT low sets the five lockout unit control voltages as follows LISMIN low, LISDONE low, SNDDONE low, SNDDONE BAR high, and LISDLY BAR high. WAIT high starts charging listen delay resistor-capacitor network (C10 1 microfarad and R19 1 meg ohms) to provide LISDLY BAR low after about one second which ends the listen delay step.

The listen window is a predetermined period of about one second as defined by the listen delay resistor-capacitor network. If no WAIT SIG IN from the remote telephone coder is detected during the listen delay step, the local telephone coder enters the send signal step.

The send signal step is started by LISDLY BAR low at NOR gate u8e (¼ 74HC32 OR gate, plus ⅙ 74HC14 inverter). NOR gate u8e becomes high causing both OR gate u8b (¼ 74HC32) and AND gate u6a (¼ 74HC08) to become high (SND DONE BAR must be high as well). Signal gate u6b (¼ 74HC08) then alternates between high and low in response to the high input from AND gate u6a and the wait signal input F1 (1800 Hz square wave).

WAIT SIG OUT from signal gate u6b is routed by routing switch u1 in code unit 40 and through Tx filter u4 into the transmitting channel to provide WAIT SIG OUT to the remote telephone coder through telecommunication system 12. A wait signal voltage divider network (R21 43 k and R22 4.7 k ohms) reduces the amplitude of WAIT SIG OUT to meet FCC telephone system requirements.

AND gate u6a high also starts charging send signal resistor-capacitor network (C12 2.2 microfarads and R20 1 meg ohms) which clocks close window latch u12b high after about two seconds, terminating the send signal step. Inverters u9b (⅙ 74HC14) and u9c (⅙ 74HC14) provide a sharp rising edge for clocking latch u12b.

SNDDONE then goes high and SNDDONE BAR goes low. SNDDONE BAR low causes AND gate u6a to go low blocking WAIT SIG OUT and terminating WAIT SIG OUT to the remote telephone coder. Diode D4 (1N4002) permits the rapid discharge of C12 after AND gate u6a goes low.

The remote telephone coder detects the presence and then the termination of WAIT SIG OUT from the local telephone coder and advances from the receive signal step to the send signal step. The 1800 Hz WAIT SIG IN from the remote telephone coder lasts for about two seconds and advances the local telephone coder from the send code step to the receive signal step (assuming the local code wait switch was pressed first).

WAIT SIG IN enters the receiving channel and passes through demodulator 70. The output (high) of the demodulator charges receive signal resistor-capacitor network (C11 1 microfarad and R18 470 k ohms).

After about 0.4 seconds listen minimum AND gate u6c (¼ 74HC08) goes high clocking listen minimum latch u11a (output Q) into the high state. Inverters u9d (⅙ 74HC14) and u9e (⅙ 74HC14) provide a sharp rising edge for triggering AND gate u6c.

After about two seconds the remote telephone coder terminates WAIT SIG IN in the receiving channel causing listen done AND gate u6d to go high. Listen done latch u11b then clocks high providing LISDONE high. Diode D3 (1N4002) permits the rapid discharge of C11 after WAIT SIG IN from the remote telephone coder is terminated.

SNDDONE high and LISDONE high provide LOCKOUT high out of AND gate u7d (¼ 74HC08) to routing switch u1 and to CODE LED through current limiting resistor R28 (360 ohms).

If WAIT SIG IN from the remote telephone coder is detected during the listen delay step (and present for about 0.4 seconds), the local telephone coder jumps to the receive signal step. This occurs when the wait switch on the remote coder is pressed first. The listen minimum AND gate u6c then goes high clocking listen minimum latch u11a into the high state.

During the listen delay step, LISDLY BAR high is presented to AND gate u6c through OR gate u8c (¼ 74HC32). Resistor R44 (100k ohms) and capacitor C18 (0.1 microfarads) establish a short reliability delay between the end of the send period and the beginning of the listen period for preventing false switching.

LIS MIN goes high forcing NOR gate u8e low which prevents signal AND gate u6b from passing WAIT SIG OUT. After two seconds the remote telephone coder terminates WAIT SIG IN in the receiving channel causing listen done AND gate u6d to go high. Listen done latch u11b then goes high providing LISDONE high. LISDONE high through OR gate u8b and SNDDONE BAR high at the input of u6a open a send window as described above. After 2 seconds SNDDONE goes high and SNDDONE BAR goes low ending the send window. SDNDONE high and LISDONE high activate AND gate u7d (¼ 74HC08) to provide LOCKOUT high.

DEMODULATOR 70 (FIG. 7)

Demodulator stage 70 is responsive to the in-coming wait signal WAIT SIG IN from the remote coder for determining when the 1800 Hz signal is present and not present. Demodulator 70 converts WAIT SIG IN into a high output (VCC) when the wait signal is present, or into a low output (ground) when the signal is absent. The WAIT SIG IN is switched in and out of the demodulator input by routing switch u1.

WAIT SIG IN (1800 Hz) enters the demodulator through an input high pass filter (capacitor C17 0.1 microfarads and resistor R31 20 k ohms). The high pass filter blocks any DC component from the inverting input of restoring comparator u13a (¼ LM339). Comparator u13a restores WAIT SIG IN from the remote telephone coder to a constant amplitude square wave having a high level at VCC and low level at ground. The non-inverting input is connected to input resistor R33 (20 k ohms) and feedback resistor R43 (4.3 meg ohms).

The output of restoring comparator u13a has a high pass filter resistor-capacitor network (C15 0.01 microfarads and R40 43 k ohms) for differentiating the square wave output into a corresponding sequence of positive and negative spikes. Diode D6 (1N4002) clips the negative spikes appearing across R40.

Transistor Q2 (MPSA13) receives the positive spikes through base resistor R39 (6.8 k ohms) and provides a pulse width modulated square wave output. This output is a function of the frequency of the input spikes, which of course is the same as WAIT SIG IN. The high period of the square wave decreases with increasing frequency, and the low period stays approximately constant. As a result, the duty cycle of the square wave (ratio of high period to low period) increases as the frequency decreases.

Low-pass filter resistor-capacitor network (C16 0.1 microfarads and R34 43 k ohms) integrates the modulated square wave resulting in an average voltage level into the inverting input of threshold comparator u13b (¼ LM339). The threshold voltage at the non-inverting input is determined by a threshold resistor network (input resistor R42 20 k ohms and input resistor R41 43 k ohms and feedback resistor R35 100 k ohms). The output DEM of threshold comparator u13b is either High (VCC) or low (ground) depending on the average voltage in the modulated square wave (at inverting input of u13b). The absence of WAIT SIG IN from the demodulator input is equivalent to a zero frequency input. Resistors R36 (1 k ohms) and R37 (1 k ohms) and R38 (1 k ohms) are pull-up resistors for comparator u13a, transistor Q2, and comparator u13b respectively.

CORDLESS EMBODIMENT (FIG. 1)

The local cordless coder and telephone includes base unit 16B, and cordless unit 16L. The base unit has a local transmitter-receiver which links to a telecommunication system for communication with the remote coder. The cordless unit has a local transmitter-receiver 16TR in communication with the base transmitter-receiver, and a microphone-speaker for user communications. The cordless unit further has a local coder 16C coupled between the cordless transmitter-receiver and the microphone-speaker for encoding and decoding the user communications.

An eavesdropper employing scanner 16C can "pick-up" the communications transmitted between the base unit and the cordless unit. However during the code mode these transmissions are encoded. The scanner enters the communication loop after the encoding. Similarly, an eavesdropper employing a small bug hidden in main portion 17M of a remote telephone (see FIG. 1) also enters the communication loop after the encoding.

Encoder 16R is connected between main portion 17M and hand portion 17H. Encoder 16R encodes transmitted communications before they reach the bug in main portion 17M, and decodes received communications after they have passed the bug.

A wait circuit within the local coder advances the local coder from the normal mode of operation to a wait mode of operation. Local coder 16C has a listen delay circuit, a listen circuit, a send circuit, a lockout circuit, and a code unit which function in the same capacity as described in connection with telephone coder 10L (FIGS. 1–7). A battery power source powers the local coder during the wait mode and the code mode. During the normal mode the coder need not be powered and the cordless telephone may function normally.

METHOD OF OPERATION (FIG. 8)

Figure 8:
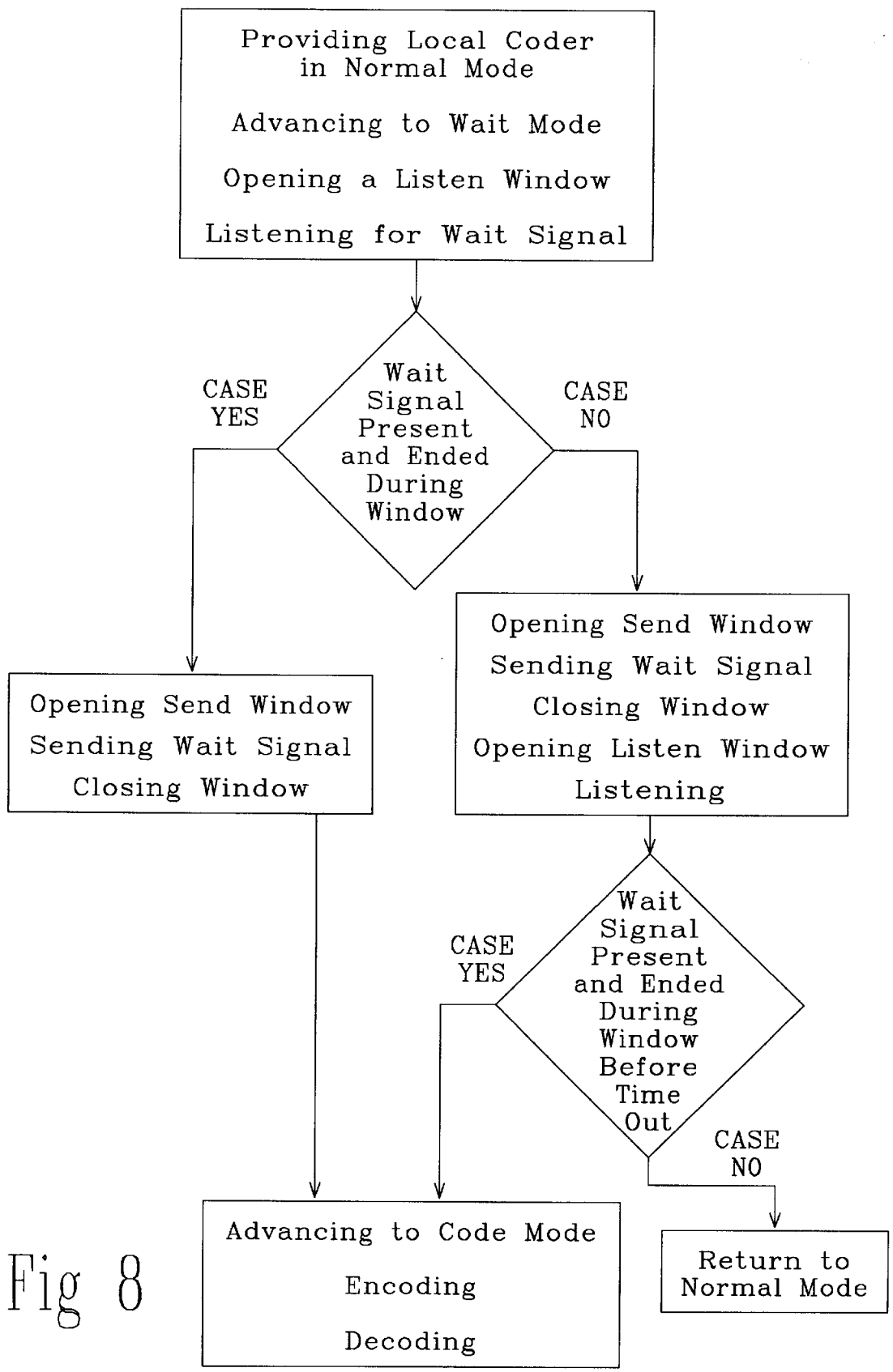
FIG. 8 is a flow chart illustrating the method steps of the telephone coder invention.

The method of enabling encoding and decoding communications between a local telephone and a remote telephone and locking out any extension telephones, include the following steps (shown in FIG. 8).

Providing a local coder in the normal mode of operation during which normal "in-the-clear" communication is permitted. That is, in the normal mode out-going communications from the local coder are not encoded and in-coming communications to the local coder are not decoded.

Advancing the local coder from the normal mode of operation to the wait mode of operation during which the local coder listens for a wait signal from the remote coder.

Opening a listen window in the local coder to the remote coder as the local coder advances from the normal mode to the wait mode.

Listening for an in-coming wait signal WAIT SIG IN from the remote coder during the listen window. An in-coming wait signal indicates that the remote coder has also advanced to the wait mode.

Determining Yes/No if an in-coming wait signal from the remote coder is present and has ended (CASE YES) or not present at all (CASE NO).

CASE YES
    Opening a send window in the local coder to the remote coder.
    Sending an out-going wait signal WAIT SIG OUT to the remote coder during the send window indicating that the local coder has advanced to the wait mode.
    Closing the send window (proceed to the "Advancing" step below).

CASE NO
    Opening a send window in the local coder to the remote coder.
    Sending an out-going wait signal to the remote coder during the send window indicating that the local coder has advanced to the wait mode.
    Closing the send window.
    Opening a listen window in the local coder to the remote coder.
    Listening for an in-coming wait signal from the remote coder during the listen window indicating that the remote coder has now advanced to the wait mode.
    Determining Yes/No if an in-coming wait signal from the remote coder is present and has ended (CASE YES) or not present at all (CASE NO). For CASE YES proceed to the "Advancing" step below. For CASE NO, return to the normal mode of operation. If the in-coming wait signal has not appeared by the close of the listen window, the coder will default or "time-out" to the normal mode.

Advancing the local coder from the wait mode of operation to the code mode of operation during which the local coder and the remote coder are enabled to encode out-going communications and to decode in-coming communications. In the code mode, any extension coders are prevented from the encoding and decoding.

Encoding out-going communications from the local coder to the remote coder during the code mode.

Decoding in-coming communications to the local coder from the remote coder during the code mode.

SPECIFIC EMBODIMENT

The particulars and components of a specific embodiment of the telephone coder have been given throughout the above text as an illustrative working example of the coder circuitry. The values, IC components and other information given are not intended as defining the limitations of the invention. Numerous other applications and configurations are possible. All of the inverters are of the Schmitt trigger type.

INDUSTRIAL APPLICABILITY

It will be apparent to those skilled in the art that the objects of this invention have been achieved by providing a coder apparatus and method which prevents telecommunication eavesdropping and does not require the user to discover and disconnect extension telephones and other unauthorized listening devices. The local coder and the remote coder cooperate to encode and decode all transmissions when in the code mode. The eavesdropper only hears the transmission when encoded. The existing system of conveniently located extension telephones may remain in place. The coder is low cost, may be installed as simply as an ordinary telephone answering machine, and is easily operated by pressing the wait switch. The advance to the code mode and return to the normal mode are automatic. The coder is compatible with all conventional telephone sets, and may be disconnected, moved from office to home or hotel, and reinstalled as required.

CONCLUSION

Clearly various changes may be made in the structure and embodiments shown herein without departing from the concept of the invention. Further, features of the embodiments shown in the various figures may be employed with the embodiments of the other figures.

Therefore, the scope of the invention is to be determined by the terminology of the following claims and the legal equivalents thereof.

I claim as my invention:

1. A local communication coder for linking between a local telephone and a telecommunication system, and responsive to an in-coming wait signal from a cooperating remote communication coder linked to the telecommunication system, for enabling the local coder and the remote coder to encode and decode communications, and for locking out any cooperating extension communication coders linked to the telecommunication system from encoding and decoding communications, the local coder comprising:

wait means for advancing the local coder from a normal mode of operation during which out-going communications from the local coder are not encoded and in-coming communications to the local coder are not decoded, to a wait mode of operation during which the local coder listens for the wait signal from the remote coder;

listen delay means responsive to the wait means for opening a listen window in the local coder to the remote coder as the local coder advances from the normal mode of operation to the wait mode of operation;

listen means for detecting the in-coming wait signal from the remote coder during the wait mode to determine if the remote coder has advanced to the wait mode of operation;

send means responsive to the listen means for opening a send window, and for sending an out-going wait signal to the remote coder indicating that the local coder has advanced to the wait mode of operation;

lockout means responsive to the listen means and to the send means for advancing the local coder from the wait mode of operation to a code mode of operation during which the local coder and the remote coder are enabled to encode out-going communications and to decode in-coming communications, and for locking out any extension coders from the encoding and decoding;

code means responsive to the lockout means for the encoding out-going communications from the local coder to the remote coder during the code mode, and for decoding in-coming communications to the local coder from the remote coder during the code mode.

2. The local communication coder of claim 1, wherein the wait means comprises a user wait switch by which a local user advances the local coder from the normal mode to the wait mode.

3. The local communication coder of claim 2, wherein the wait switch is a momentary contact and release switch, and the wait means further comprises wait latch means responsive to the momentary contact wait switch for preventing the local coder from returning to the normal mode after the momentary contact wait switch has been released by the local user.

4. The local communication coder of claim 3, wherein the local coder further comprises:

system interface means for linking the local coder to the telecommunication system, and for sensing the presence of system current from the telecommunication system.

5. The local communication coder of claim 4, further wherein:

the wait latch means is responsive to the system interface means for permitting the local coder to advance from the normal mode to the wait mode when system current is present, and for returning the local coder to the normal mode when system current is not present.

6. The local communication coder of claim 3, wherein the local coder further comprises:

telephone interface means for connection to the local telephone for sensing whether the local telephone is cradled on hook or lifted off hook.

7. The local communication coder of claim 6, further wherein:

the wait latch means is responsive to the telephone interface means for permitting the local coder to advance from the normal mode to the wait mode when the local telephone is off hook, and for returning the local coder to the normal mode when the local telephone is on hook.

8. The local communication coder of claim 3, further wherein:

the wait latch means is powered by the local coder operating power for permitting the local coder to advance from the normal mode to the wait mode when the operating power is present, and for returning the local coder to the normal mode when operating power is not present.

9. The local communication coder of claim 2, wherein the wait means further comprises:

a wait mode indicator for indicating to the local user when the local coder has advanced to the wait mode of operation.

10. The local communication coder of claim 9, wherein the wait mode indicator is a user visible light on the local coder which is on when the local coder is in the wait mode.

11. The local communication coder of claim 9, wherein the wait mode indicator is a user audible tone which is played into the local telephone when the local coder is in the wait mode.

12. The local communication coder of claim 2, wherein the local coder is powered off while in the normal mode of operation and is powered on when the wait means advances the local coder from the normal mode of operation to the wait mode of operation.

13. The local communication coder of claim 12, wherein the local coder further comprises:

a battery power source for powering the local coder during the wait mode and the code mode.

14. The local communication coder of claim 1, wherein the wait means further comprises:

a system isolation means responsive to the wait switch for isolating the telecommunication system from the local coder while the local coder is in the normal mode, and for coupling the telecommunication system to the local coder while the local coder is in the wait mode or the code mode.

15. The local communication coder of claim 14, wherein the system isolation means is a relay means having an isolation position in which the local coder is disconnected from the telecommunication system and the local telephone is connected to the telecommunication system, and having a connected position in which the local coder is connected to the telecommunication system and the local telephone is connected to the local coder.

16. The local communication coder of claim 15, wherein the relay means is in the isolation position when the local coder is unpowered.

17. The local communication coder of claim 15, wherein the relay means comprises:
- a system relay for isolating the telecommunication system from the local coder when in the isolation position; and
- a telephone relay for isolating the local telephone from the local coder when in the isolation position.

18. The local communication coder of claim 1, wherein the listen window is opened by the listen delay means for a predetermined period of time.

19. The local communication coder of claim 18, wherein the predetermined period of the listen window is about one second, and the listen delay means is a resistor-capacitor charging circuit.

20. The local communication coder of claim 1, wherein the listen means further comprises:
- a demodulator stage responsive to the in-coming wait signal from the remote coder for determining when the listen means has been listening to the in-coming wait signal for a minimum period of time;
- a listen minimum stage responsive to the listen delay means during the listen window and to the demodulator stage after the minimum period for providing a listen minimum status;
- the listen minimum stage responsive to the send means after the send window has closed and to the demodulator stage after the minimum period for providing the listen minimum status; and
- a listen done stage responsive to the listen minimum status of the listen minimum stage and to the demodulator stage after the minimum period, for detecting the termination of the in-coming wait signal from the remote coder to provide a listen done status.

21. The local communication coder of claim 20, wherein the minimum period is about 0.4 seconds.

22. The local communication coder of claim 1, wherein the send means further comprises:
- an open window stage responsive to the listen means for opening the send window in order to start sending the out-going wait signal to the remote coder;
- send delay means responsive to the open window stage for holding the send window open for the duration of the send window;
- a close window stage responsive to the send delay means for closing the send window in order to stop sending the out-going wait signal to the remote coder.

23. The local communication coder of claim 22, wherein the send window is held open by the send delay means for a predetermined period of time.

24. The local communication coder of claim 23, wherein the predetermined period of the send window is about two seconds, and the send delay means is a resistor-capacitor charging circuit.

25. The local communication coder of claim 1, wherein the code means further comprises:
- routing means having a wait mode state for the wait mode of operation and a code mode state for the code mode of operation, and responsive to the listen means and the send means, for routing the out-going wait signal from the local coder to the remote coder when in the wait mode state, and routing the out-going communications from the local coder to the remote coder when in the code mode state, and for routing the in-coming wait signal from the remote coder to the listen means when in the wait mode state and routing the in-coming communications from the remote coder to the code means when in the code mode state.

26. The local communication coder of claim 1, wherein the code means further comprises:
- encoder means for encoding out-going communications from the local coder to the remote coder when the local coder is in the code mode; and
- decoder means for decoding in-coming communications to the local coder from the remote coder when the local coder is in the code mode.

27. The local communication coder of claim 26, wherein the local coder further comprises a code mode indicator.

28. The local communication coder of claim 26, wherein the code means is a frequency inversion device.

29. The local communication coder of claim 28, wherein the frequency inversion device has an inversion frequency of 3600 Hz.

30. A local cordless coder telephone comprising:
- base unit for linking to a telecommunication system for communication with the remote coder, and having a local transmitter-receiver;
- cordless unit having a local transmitter-receiver in communication with the base transmitter-receiver, a microphone-speaker for user communications, and a local coder coupled between the cordless transmitter-receiver and the microphone-speaker for encoding and decoding the user communications;
- wait means within the local coder for advancing the local coder from a normal mode of operation during which communications transmitted from the cordless unit to the base unit are not encoded and communications received by the cordless unit from the base unit are not decoded, to a wait mode of operation during which the local coder listens for the in-coming wait signal from a cooperating remote coder also linked to the telecommunication system;
- listen delay means within the local coder responsive to the wait means for opening a listen window as the local coder advances from the normal mode to the wait mode;
- listen means within the local coder for detecting the in-coming wait signal from the remote coder during the wait mode indicating that the remote coder has advanced to the wait mode;
- send means within the local coder responsive to the listen means for opening a send window, and for sending an out-going wait signal to the remote coder indicating that the local coder has advanced to the wait mode;
- lockout means within the local coder responsive to the listen means and to the send means for advancing the local coder from the wait mode to a code mode during which the local coder and the remote coder are enabled to encode transmitted communications and to decode received communications, and during which any extension coders linked to the telecommunication system are locked out from the encoding and decoding; and
- code means within the local coder responsive to the lockout means for encoding communications transmitted from the cordless unit to the base unit during the code mode, and for decoding communications received by the cordless unit from the base unit during the code mode.

31. A coder method of enabling encoding and decoding communications between a local telephone and a remote telephone and locking out any extension telephones, comprising:
- providing a local coder in a normal mode of operation during which out-going communications from the local coder are not encoded and in-coming communications to the local coder are not decoded;

advancing the local coder from the normal mode of operation to a wait mode of operation during which the local coder listens for an in-coming wait signal from the remote coder;

opening a send window in the local coder to the remote coder during the wait mode;

sending an out-going wait signal to the remote coder during the send window indicating that the local coder has advanced to the wait mode;

closing the send window during the wait mode;

advancing the local coder from the wait mode of operation to a code mode of operation during which the local coder and the remote coder are enabled to encode out-going communications and to decode in-coming communications, and during which any extension coders are prevented from the encoding and decoding;

encoding out-going communications from the local coder to the remote coder during the code mode; and decoding in-coming communications to the local coder from the remote coder during the code mode.

32. The coder method of claim 31, further comprising the additional step of:

listening for the in-coming wait signal from the remote coder after the send window has closed indicating that the remote coder has advanced to the wait mode.

33. The coder method of claim 31, further comprising the additional steps of:

opening a listen window in the local coder to the remote coder as the local coder advances from the normal mode to the wait mode;

listening for the in-coming wait signal from the remote coder during the listen window indicating that the remote coder has advanced to the wait mode.

* * * * *